United States Patent
Oguchi et al.

(10) Patent No.: US 6,631,642 B2
(45) Date of Patent: Oct. 14, 2003

(54) EXTERNAL FORCE DETECTING SENSOR (75) Inventors: Takahiro Oguchi, Nagaokakyo (JP); Yoshihiro Konaka, Nagaokakyo (JP); Teruhisa Shibahara, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/898,303

(22) Filed: Jul. 3, 2001

(65) Prior Publication Data
US 2002/0033047 A1 Mar. 21, 2002

(30) Foreign Application Priority Data

Jul. 6, 2000 (JP) .......................... 2000-205324

(51) Int. Cl.$^7$ ..................... G01P 15/125; G01P 15/08
(52) U.S. Cl. ................. 73/514.32; 73/514.16; 73/504.12
(58) Field of Search ................ 73/514.32, 514.18, 73/514.21, 514.23, 514.36, 514.16, 514.29, 514.38, 504.02, 504.04, 504.12; 361/280, 283.1, 283.3

(56) References Cited

U.S. PATENT DOCUMENTS

| | | | | |
|---|---|---|---|---|
| 5,495,761 A | * | 3/1996 | Diem et al. | 73/514.32 |
| 5,618,989 A | * | 4/1997 | Marek | 73/514.32 |
| 6,084,257 A | * | 7/2000 | Petersen et al. | 73/514.32 |
| 6,105,427 A | * | 8/2000 | Stewart et al. | 73/514.32 |
| 6,149,190 A | * | 11/2000 | Galvin et al. | 73/514.32 |
| 6,263,735 B1 | * | 7/2001 | Nakatani et al. | 73/514.32 |

FOREIGN PATENT DOCUMENTS

| | | |
|---|---|---|
| JP | 10-104263 | 4/1998 |
| JP | 10-182527 | 6/1998 |

* cited by examiner

*Primary Examiner*—Helen Kwok
(74) *Attorney, Agent, or Firm*—Keating & Bennett, LLP (57) ABSTRACT

When a cavity accommodating movable portion of an external force detecting sensor has a narrow structure, the external force detecting sensor is influenced by air damping, and therefore the cavity should have a wide structure. However, when a top surface and bottom surface of the cavity are positioned too high, the range of vertical movement of the movable portion is increased, and when an external impact force is applied to the external force detecting sensor, a movable interdigitated electrode rides on fixed interdigitated electrodes and stays there, thus the external force detecting sensor is rendered inoperable. A height D from the fixed interdigitated electrodes to the top surface and bottom surface of the cavity is set by having, as elements, widths of the movable interdigitated electrode, and fixed interdigitated electrodes set to $W1$, $W2$, and $W3$, the height of the movable interdigitated electrode and fixed interdigitated electrodes set to $h$, and gaps between the movable interdigitated electrode and fixed interdigitated electrodes set to $g1$ and $g2$, and the movable portion is structured so as to securely return to the standstill position due to resiliency of a beam.

6 Claims, 4 Drawing Sheets

EXTERNAL FORCE DETECTING SENSOR

BACKGROUND OF THE INVENTION

1. Field of the Invention

The present invention relates to an external force detecting sensor formed by using a semiconductor microprocessing technique or the like.

2. Description of the Related Art

Figure 5:
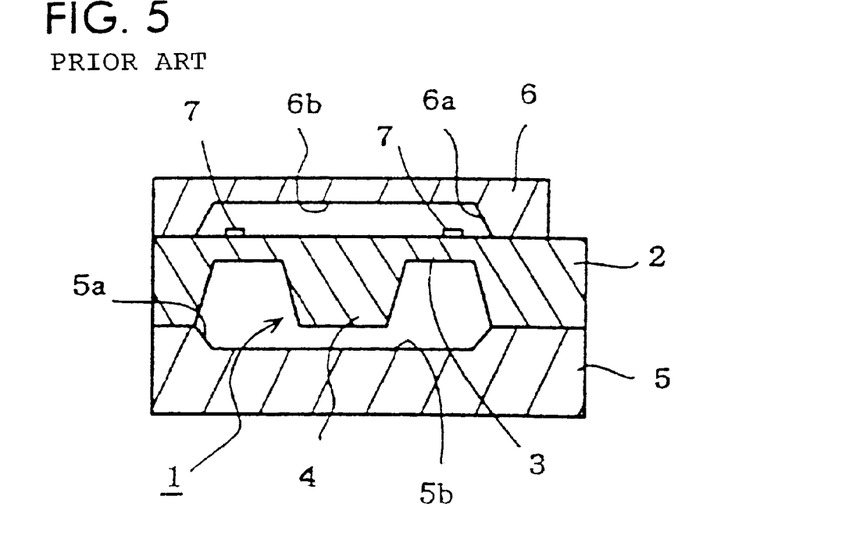
FIG. 5 is a sectional view showing a configuration of a conventional acceleration sensor.

Generally, acceleration sensors and angular velocity sensors are known as external force detecting sensors. Each of these external force detecting sensors is provided with a movable portion which is displaced in accordance with an external force, such as acceleration, angular velocity, or the like applied to the external force detecting sensor. The displacement is electrically detected to obtain an acceleration signal or angular velocity signal. For example, as shown in FIG. 5, an acceleration sensor using a piezoelectric element described in Japanese Unexamined Patent Application Publication No. 10-104263 has a movable portion 1, which includes a weight portion 4 supported on a supporter 2 by beams 3 in the central portion thereof. A supporting substrate 5 and a cap substrate 6 having recesses 5a and 6a, respectively, are mounted to the supporter 2 so as to sandwich the supporter 2 from the top and bottom. In addition, a cavity is formed at the central portion thereof using the recesses 5a and 6a of the supporting substrate 5 and the cap substrate 6, respectively, such that the movable portion 1 can be displaced. In addition, piezoelectric elements 7 are provided on the beams 3, and when acceleration is applied to the weight portion 4 to cause a stress on the beams 3, the piezoelectric elements 7 generate acceleration signals.

However, when the recesses 5a and 6a respectively provided on the supporting substrate 5 and cap substrate 6 are shallow, gaps between the weight portion 4 and a top surface 6b and bottom surface 5b become narrower, and when the weight portion 4 is rapidly displaced, a large phase lag or an output signal occurs. This is due to air damping due to the viscosity of the air sealed in the cavity. As a result, responsiveness of the acceleration sensor deteriorates. Therefore, in the above-described acceleration sensor, in order to eliminate the influence of the air damping, the recesses 5a and 6a of the supporting substrate 5 and cap substrate 6, respectively, are made higher (deeper), and thereby the vertical space in the cavity for the weight portion 4 is increased, thus improving the responsiveness of the acceleration sensor.

The influence of the air damping is the same in an external force detecting sensor which electrostatically detects an external force. Such an external force detecting sensor described in Japanese Unexamined Patent Application Publication No. 2000-22170 is described with reference to FIGS. 6 and 7. By processing a silicon substrate, two weight portions 8 and 9 are combined with supporters 11 and 12 via beams 11a and 12a, respectively, to compose a movable portion 10. The two weight portions 8 and 9 respectively have a plurality of plate-shaped movable interdigitated electrodes 8a and 9a outwardly provided thereon. Fixed portions 13 and 14 are provided at positions respectively opposing the weight portions 8 and 9. The fixed portions 13 and 14 have a plurality of plate-shaped fixed interdigitated electrodes 13a and 14a provided thereon which protruded toward the weight portions 8 and 9, respectively, and are interdigitated with the movable electrodes 8a and 9a, respectively. A frame 15 is provided so as to surround the movable portion 10 and the fixed portions 13 and 14. A functional element composed as described above is supported by a supporting substrate 18 and cap substrate 19 made of Pyrex glass so as to sandwich it from the top and the bottom. In addition, inside the functional element, a cavity is formed by recesses 18a and 19a respectively provided on the supporting substrate 18 and the cap substrate 19, so as to enable displacement of the movable portion 10. On the bottom surface of the recess 18a of the supporting substrate 18, detecting electrodes 16 and 17 are provided beneath the weight portions 8 and 9, respectively, via gaps.

Figure 6:
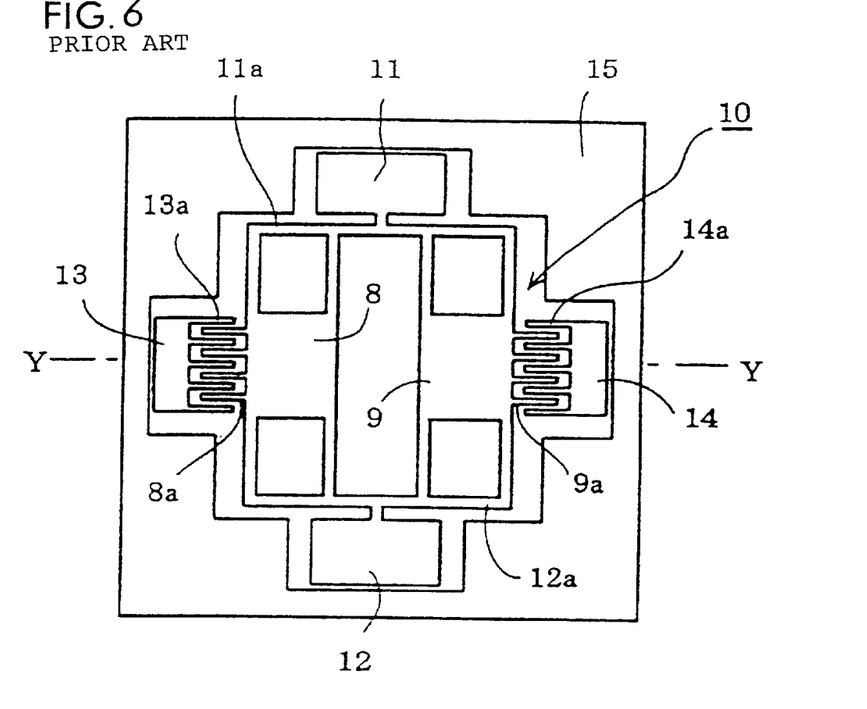
FIG. 6 is a sectional view showing a configuration of a conventional external force detecting sensor.
Figure 7:
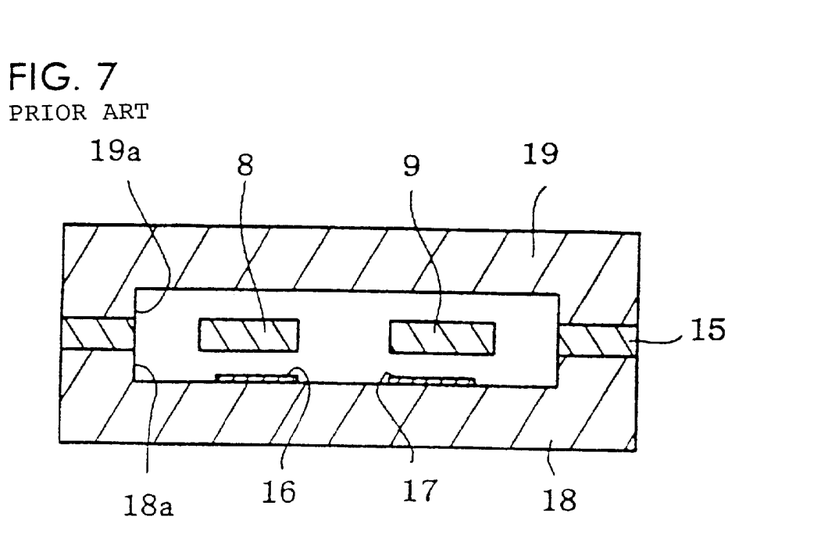
FIG. 7 is a sectional view showing a configuration of the conventional external force detecting sensor along line VII—VII in FIG. 6.

Now, an operation of the external force detecting sensor of the configuration is described when it is used as an angular velocity sensor. When a voltage is applied across the supporters 11 and 12 and the fixed portions 13 and 14, the two weight portions 8 and 9 vibrate in mutually opposing directions due to electrostatic forces exerted between the movable interdigitated electrodes 8a and 9a and the fixed interdigitated electrodes 13a and 14a. In such a vibrating state, when a rotational force is applied to the external force detecting sensor about an axis in a direction connecting the supporters 11 and 12, the two weight portions 8 and 9 experience inverse Coriolis forces in the perpendicular direction. For example, when the weight portion 8 of one side receives a downward Coriolis force, the weight portion 9 of the other side receives an upward Coriolis force, and the two weight portions 8 and 9 vibrate in vector directions respectively determined by the electrostatic force and the Coriolis forces. Due to the vibrations, electrostatic capacitances between the two weight portions 8 and 9 and the detecting electrodes 16 and 17 are differentially altered, and outputs of the two detecting electrodes 16 and 17 are converted into voltages, which are differentially amplified by a differential amplifier to obtain an angular velocity signal.

Now, an operation is described of the external force detecting sensor of the above configuration when it is used as an acceleration sensor. In a state where a D.C. voltage is applied across the supporters 11 and 12, the fixed portions 13 and 14, and the detecting electrodes 16 and 17, when an acceleration is applied to the weight portions 8 and 9, namely from a vector component in a direction connecting the two fixed electrodes, directly opposite acceleration signals are obtained from the two fixed portions 13 and 14. In other words, one of the acceleration signals increases the electrostatic capacitance and the other decreases the electrostatic capacitance. From a vector component in the vertical direction, acceleration signals are obtained from the detecting electrodes 16 and 17. Accordingly, accelerations in two directions can be detected.

In the above-described external force detecting sensor, since the movable portion 10 is displaced in a sealed cavity, the acceleration sensor is strongly influenced by air damping when the movable portion 10 is vertically displaced. In addition, in such a case, when the movable portion 10 is driven to continuously vibrate at a fixed vibration frequency, such as in the angular velocity sensor, air damping exerts an undesirable influence on the operation of the movable portion 10, such as deterioration of the mechanical quality factor of the driving vibration of the movable portion 10, or the like.

Furthermore, when the cap substrate 19 having the recess 19a formed thereon is mounted on the movable portion 10 in a manufacturing process of the external force detecting sensor, a frame 15, the supporters 11 and 12, the fixed portions 13 and 14, and the supporting substrate 18 and the cap substrate 19 are bonded together by an anodic bonding method using a high voltage; this, however, can cause the movable portion 10 to be drawn by a strong electrostatic attraction to the bottom surface of the supporting substrate 18 or the top surface of the cap substrate 19, thus rendering the movable portion 10 inoperable. Accordingly, to avoid this problem, the recesses 18a and 19a of the supporting substrate 18 and the cap substrate 19, respectively, comprising the cavity accommodating the movable portion 10 are preferably formed deep.

However, if the recesses 18a and 19a of the supporting substrate 18 and the cap substrate 19 respectively are formed too deep, the range of vertical movement of the movable portion 10 is increased, and when an external force such as an impact force or the like is applied to the external force detecting sensor from the outside, the movable interdigitated electrodes 8a and 9a of the movable portion 10 exceed the limit of natural return by resiliency of the beams 11a and 12a, thus causing the movable interdigitated electrodes 8a and 9a to ride on the fixed electrodes 13a and 14a, or to jump over the fixed electrodes 13a and 14a and stay there, thus rendering the external force detecting sensor inoperable.

SUMMARY OF THE INVENTION

In view of the above-described situations, it is an object of the present invention to provide an external force detecting sensor in which a displacement limit is defined for a movable portion in order to ensure the reliable operation thereof.

In order to solve the above-described problems, an external force detecting sensor according to a first aspect of the present invention comprises a functional element including a supporter, a movable portion having a movable interdigitated electrode, rectangular in cross-section, coupled with the supporter by a beam, and a fixed portion having a fixed interdigitated electrode, rectangular in cross-section, opposing the movable interdigitated electrode via a micro-gap; a supporting substrate for supporting the functional element from one surface side thereof; and a cap substrate mounted on the functional element from the other surface side; wherein a cavity which enables displacement of the movable portion is formed at a portion including the beam and the movable portion, and a height D from the fixed interdigitated electrode to the top surface and bottom surface of the cavity satisfies the following expression where the micro-gap is g, a width of the movable interdigitated electrode is W1, a width of the fixed interdigitated electrode is W2, and a height of the movable interdigitated electrode and fixed interdigitated electrode is h, namely:

$$D \le \frac{h}{g}(g + W1 + W2).$$

By this configuration, the height in the cavity from the fixed interdigitated electrode to the top and bottom surfaces thereof becomes a height at which the movable portion is not influenced by air damping due to a gas in the cavity, and in addition, even if an impact is applied to the external force detecting sensor to cause the movable portion to jump, and as the result, the movable interdigitated electrode falls on the fixed interdigitated electrode, the movable interdigitated electrode securely returns to the standstill position due to the resiliency of the beam.

An external force detecting sensor according to a second aspect of the present invention comprises a functional element including a supporter, a movable portion having a movable interdigitated electrode, rectangular in cross-section, coupled to the supporter via a beam, and a fixed portion having a fixed interdigitated electrode, rectangular in cross-section, opposing the movable interdigitated electrode via a micro-gap; a supporting substrate for supporting the functional element having a first recess which enables displacement of the movable portion provided; and a cap substrate for protecting the functional element having a second recess which enables displacement of the movable portion provided; wherein a height D of the first recess and the second recess satisfies the following expression where the micro-gap is g, a width of the movable interdigitated electrode is W1, a width of the fixed interdigitated electrode is W2, and a height of the movable interdigitated electrode and fixed interdigitated electrode is h, namely:

$$D \le \frac{h}{g}(g + W1 + W2).$$

Accordingly, the cavity in which the movable portion is displaced is composed of the first recess formed on the supporting substrate and the second recess formed on the cap substrate, and the height (depth) of the first recess and the second recess is set at a threshold limit value which promotes the natural return of the movable portion. Accordingly, even if the movable portion receives an impact force, the movable portion naturally returns to the original position, and the external force detecting sensor can continuously operate.

An external force detecting sensor according to a third aspect of the present invention comprises a functional element including a supporter, a movable portion having a movable interdigitated electrode, rectangular in cross-section, coupled to the supporter via a beam, and fixed portion having a fixed interdigitated electrode, rectangular in cross-section, opposing the movable interdigitated electrode via a micro-gap; a supporting substrate for supporting the functional element; and a cap substrate mounted on the functional element from the opposite side of the supporting substrate; wherein a cavity is formed by processing any two of the functional element, the supporting substrate, and the cap substrate at a portion including the beam and the movable portion, and a height D of the recesses and the cavity satisfies the following expression where the micro-gap is g, a width of the movable interdigitated electrode is W1, a width of the fixed interdigitated electrode is W2, and a height of the movable interdigitated electrode and fixed interdigitated electrode is h, namely:

$$D \le \frac{h}{g}(g + W1 + W2).$$

Since the cavity is a space which enables displacement of the movable portion, the cavity can be formed on the functional element itself when the functional element is processed. Therefore, when either of the supporting substrate or the cap substrate, including the functional element, is processed, spaces are formed above and beneath the movable portion. Even in this case, since the movable portion functions sufficiently, and the supporting substrate and cap substrate work as stoppers even if the movable portion jumps due to an impact force, the movable interdigitated electrode never remains riding on the fixed interdigitated electrode.

An external force detecting sensor according to a fourth aspect of the present invention comprises a functional element including a fixed portion, a supporter, and a movable portion coupled to the supporter by a beam; a supporting substrate for supporting the functional element; and a cap substrate for protecting the functional element; wherein the supporting substrate and the cap substrate are arranged so as to sandwich the functional element from both surfaces of the functional element while forming a cavity, which enables displacement of the movable portion, at a portion including the beam and movable portion, the movable interdigitated electrode, rectangular in cross-section, is provided on the movable portion and the fixed interdigitated electrode, rectangular in cross-section, which is provided with the movable interdigitated electrode via a common micro-gap is provided on the fixed portion, and the height from the movable portion to the top surface and the bottom surface of the cavity is set to be the same as or lower than a height of a surface of the movable interdigitated electrode at a far side from the fixed interdigitated electrode when the movable interdigitated electrode is moved along a straight line passing through peaks of corners diagonally positioned on opposing sides of the movable interdigitated electrode and the fixed interdigitated electrode which are adjacent across the micro-gap, and when surfaces of the movable interdigitated electrode and the fixed interdigitated electrode on sides which are not opposed are positioned in the same plane.

According to the present invention, independence of the size of the impact force applied to the external force detecting sensor, since the movable portion inevitably collides with the top or bottom surface of the cavity, the top or bottom surface works as a stopper, thereby even if the movable portion collides with the top or bottom surface and the movable interdigitated electrode falls on the fixed interdigitated electrode, the movable interdigitated electrode is securely drawn back to the original standstill position, thus facilitating continuous use of the external force detecting sensor.

Other features and advantages of the present invention will become apparent from the following description of the invention which refers to the accompanying drawings.

DETAILED DESCRIPTION OF EMBODIMENTS OF THE INVENTION

Embodiments of the present invention are described below with reference to the drawings.

Figure 1:
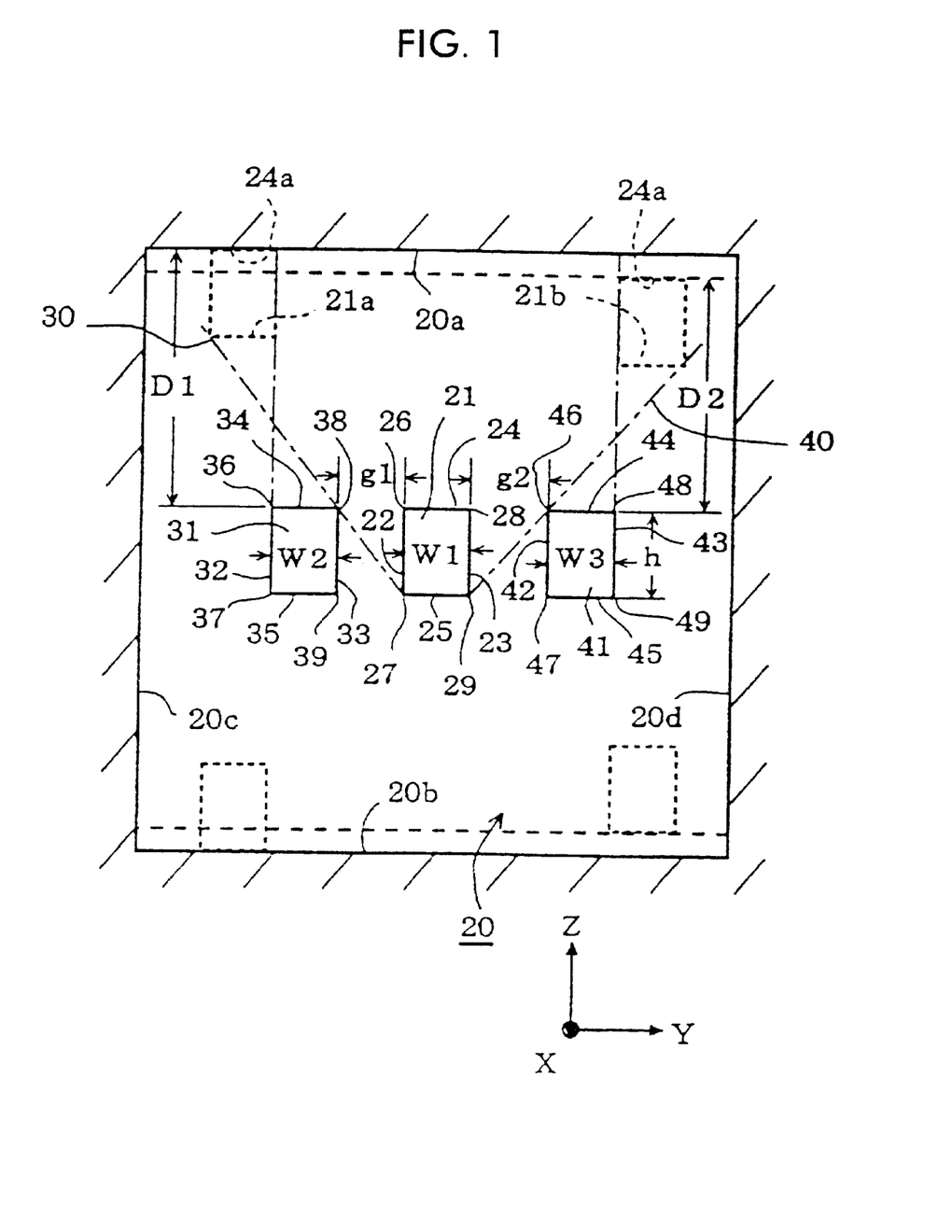
FIG. 1 is a diagrammatic view showing a basic configuration of an external force detecting sensor according to the present invention.

FIG. 1 shows a diagrammatic view of a basic configuration of an external force detecting sensor according to the present invention. In order to simplify the description, only a cavity 20, movable interdigitated electrode 21, and two fixed interdigitated electrodes 31 and 41 of the functional element of the external force detecting sensor, to be later described, arranged in the cavity, are shown. Details of the external force detecting sensor are described later.

In FIG. 1, the cavity 20 is defined by a top surface 20a, a bottom surface 20b, a right side surface 20c and a left side surface 20d. In the center of the cavity 20, one movable interdigitated electrode 21 is arranged, and on the right and the lefts of the movable interdigitated electrode 21, the two fixed interdigitated electrodes 31 and 41 are respectively arranged via micro-gaps g1 and g2 so as to be interdigitated with the movable electrode 21. The movable interdigitated electrode 21 is rectangular in cross-section, and is provided with a left movable surface 22, a right movable surface 23, an upper movable surface 24, and a lower movable surface 25. Four right angle corners 26, 27, 28, 29 are formed by intersections of the left movable surface 22, and the right movable surface 23, the upper movable surface 24, and the lower surface 25. The fixed interdigitated electrodes 31 and 41 are, likewise, rectangular in cross-section, and are provided with left fixed surfaces 32 and 42, right fixed surfaces 33 and 43, upper fixed surfaces 34 and 44, and lower fixed surfaces 35 and 45, and four right angle corners 36, 37, 38, 39 formed by intersections of the left fixed surface 32 the right fixed surface 33, the upper fixed surface 34, and the lower fixed surface 35, and four right angle corners 46, 47, 48, 49 formed by intersections of the left fixed surface 42, and the right fixed surface 43, the top-side fixed surface 44, and the lower fixed surface 45. In addition, heights h of the movable interdigitated electrode 21 and the fixed interdigitated electrodes 31 and 41 are all the same, and the movable interdigitated electrode 21 has a width W1, while the fixed interdigitated electrodes 31 and 41 have widths W2 and W3, respectively.

The configuration shows a state when the external force detecting sensor is at a standstill. When an acceleration or angular velocity is applied to the movable electrode 21, the movable interdigitated electrode 21 can be displaced in any one of the following directions: the horizontal direction shown in the drawing (Y direction); the vertical direction shown in the drawing (Z direction); and the direction perpendicular to the paper surface (X direction). On the other hand, the fixed interdigitated electrodes 31 and 41 are set at fixed positions, and when the movable interdigitated electrode 21 is displaced, areas of the surfaces of the movable interdigitated electrode 21 and the fixed interdigitated electrodes 31 and 41 opposing each other change, and the distances of the micro-gaps g1 and g2 between opposing surfaces of the movable electrode 21 and the fixed interdigitated electrodes 31 and 41 changed. These changes cause variations in electrostatic capacitances when a voltage is applied across the movable interdigitated electrode 21 and the fixed interdigitated electrodes 31 and 41.

When the movable portion of the functional element receives an impact from an obliquely vertical direction under the above-described conditions, the movable portion moves in the cavity 20, and as a result, the movable interdigitated electrode 21 also moves. Accordingly, when the value of the heights from the upper fixed surfaces 34 and 44 and lower fixed surfaces 35 and 45 of the fixed interdigitated electrodes 31 and 41 to the top surface 20a and the bottom surface 20b of the cavity 20 is excessively large, the movable interdigitated electrode 21 rides on the fixed interdigitated electrodes 31 and 41, or jumps over the fixed interdigitated electrodes 31 and 41, making it impossible for the movable interdigitated electrode 21 to naturally return to its original standstill position. In view of such a problem, in the present invention, the heights to the top surface 20a and the bottom surface 20b in the cavity 20 in which the movable interdigitated electrode 21 can be displaced is regulated.

Firstly, the range over which the movable interdigitated electrode 21 can be displaced is restricted by the fixed interdigitated electrodes 31 and 41 located on both sides thereof. Namely, if the movable interdigitated electrode 21 is assumed to be linearly displaced above the fixed interdigitated electrodes 31 and 41, with regard to the movable electrode 21 and the fixed interdigitated electrode 31 which are adjacent across a micro gap g1, the movable interdigitated electrode 21 can be displaced to a region on the right of a straight line 30 passing through the corner 27 and the corner 38 which are diagonally positioned on opposing sides of the movable interdigitated electrode 21 and the fixed interdigitated electrode 31, respectively, via the micro-gap g1. In other words, when the widths of the movable interdigitated electrode 21 and the fixed interdigitated electrode 31 are taken into consideration, the movable interdigitated electrode 21 can be displaced to a region on the right-hand side of a sloping surface passing through an edge formed by the left movable surface 22 and lower movable surface 25 of the movable interdigitated electrode 21 and an edge formed by the right fixed surface 33 and upper fixed surface 34 of the fixed interdigitated electrode 31. The slope of the straight line is determined by the micro-gap g1 and the height h of the movable interdigitated electrode 21 and fixed interdigitated electrode 31, namely h/g1.

Likewise, with regard to the movable interdigitated electrode 21 and the fixed interdigitated electrode 41 which are adjacent across the micro-gap g2, the movable interdigitated electrode 21 can be displaced to a region on the left-hand side of a sloping surface passing through an edge formed by the right movable surface 23 and lower movable surface 25 of the movable interdigitated electrode 21 and an edge formed by the left fixed surface 42 and upper surface 44 of the fixed interdigitated electrode 41. When this region is viewed in cross-section, the region is on the left-hand side of a straight line 40 passing through the corner 29 of the movable interdigitated electrode 21 and the corner 46 of the fixed interdigitated electrode 41 which are obliquely (diagonally) positioned via the micro-gap g2. The slope of the straight line is determined by the micro-gap g2 and the height h of the movable interdigitated electrode 21 and fixed interdigitated electrode 41, namely h/g2.

Beneath the fixed interdigitated electrodes 31 and 41, the range over which displacement of the movable interdigitated electrode 21 is restricted is the same as described above, and therefore a description thereof is omitted.

Now, restricting regions above and beneath the movable interdigitated electrode 21 are described. The movable interdigitated electrode 21 moves upward along the line 30, with the right movable surface 23 of the movable interdigitated electrode 21 opposing the fixed interdigitated electrode 41 being positioned in the same plane as the left fixed surface 32 of the fixed interdigitated electrode 31, that is, the side thereof not opposing the movable interdigitated electrode 21, and the position of the upper movable surface 24 of the movable interdigitated electrode 21, in other words, the height D1 from the upper fixed surface 34 of the fixed interdigitated electrode 31 to the upper movable surface 24a of the movable interdigitated electrode 21a, is set as a limit to which the movable interdigitated electrode 21 can be displaced upward. The height D1 of the limit is also the same beneath the movable interdigitated electrode 21, and by setting the height of the top surface 20a and bottom surface 20b of the cavity 20 at the same height as D1 or lower than D1, the movable interdigitated electrode 21 does not stay riding on the fixed interdigitated electrode 31 in the left region of the cavity 20; rather, it returns to the original standstill position. That is, the height D1 from the fixed interdigitated electrode 31 to the top surface 20a and bottom surface 20b of the cavity 20 can be defined by the following expression where the width of the movable interdigitated electrode 21 is W1 and the width of the fixed interdigitated electrode 31 is W2, namely:

$$D1 \le \frac{h}{g1}(g1 + W1 + W2).$$

Furthermore, in the right-hand region of the cavity 20, similarly to the above, when the a corner 29 of the movable interdigitated electrode 21 is positioned on the straight line 40, and the left movable surface 22 of the movable interdigitated electrode 21 is positioned in the same plane as the right fixed surface 43 of the fixed electrode 41, the height D2 from the upper fixed surface 44 of the fixed interdigitated electrode 41 to an upper movable surface 24a of movable interdigitated electrode 21b displaced upward is the limit to which the movable interdigitated electrode 21 can be displaced. The limit height D2 is also set to the same height beneath the movable interdigitated electrode 21. Accordingly, when the height D2 from the fixed interdigitated electrode 41 to the top surface 20a and bottom surface 20b of the cavity 20 is set according to the following expression, where the width of the fixed interdigitated electrode is W3, the movable interdigitated electrode 21 never remains riding on the fixed interdigitated electrode 41 in the right-hand region of the cavity 20, namely:

$$D2 \le \frac{h}{g2}(g2 + W1 + W3).$$

When the micro-gap g1 is smaller than the micro-gap g2 (g1<g2), since the height D2 in the right-hand region is lower than the height D1 in the left-hand region of the cavity 20 (D1>D2), the height common to the right-hand and left-hand regions of the cavity 20 is set to D2. By this configuration, the movable interdigitated electrode 21 can move inside the cavity 20 without being influenced by air damping, and securely returns to the original standstill position even if it reacts vigorously to a received impact force.

Ordinarily, in order to facilitate manufacture, the micro-gaps g are set to be the same (g1=g2), and the widths W of the movable interdigitated electrode 21 and fixed interdigitated electrodes 31 and 41 are set to be the same (W1=W2=W3), and therefore the height D from the fixed interdigitated electrodes 31 and 41 to the top surface 20a and the bottom surface 20b of the cavity 20 is set so as to satisfy the following expression:

$$D \le \frac{h}{g}(g + 2W).$$

Figure 2:
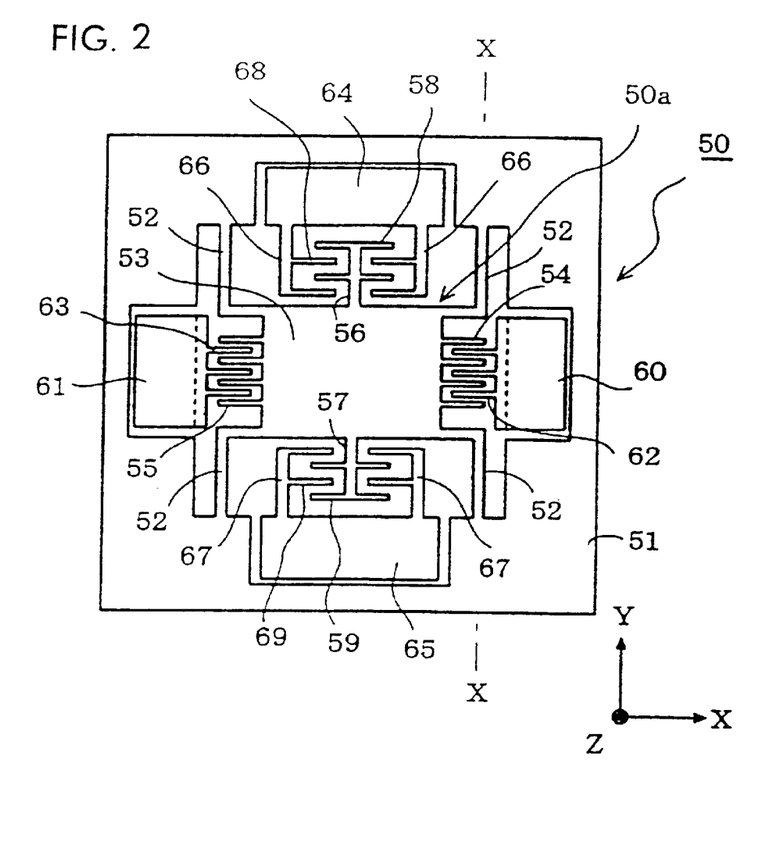
FIG. 2 is a plan view showing a configuration of a functional element of the external force detecting sensor according to the present invention.

Now, an embodiment of the external force detecting sensor is described with reference to FIG. 2. A functional element 50 is manufactured by processing a silicon substrate, and includes a movable portion 50a and fixed portions 60 and 61. The movable portion 50a is composed of a weight portion 53 supported by four L-shaped beams 52 at the center of a frame-shaped supporter 51. The movable portion 50a has a thickness in the direction perpendicular to the paper surface (Z-axis direction), and the beams 52 are plate-shaped. The weight portion 53 has a plurality of plate-shaped movable interdigitated electrodes 54 and 55 protruding from both sides in the horizontal direction of the drawing (X-axis direction) which are arranged at uniform intervals along a line in the vertical direction of the drawing (Y-axis direction). In addition, both sides in the Y-axis direction of the weight portion 53, movable electrode supporting plates 56 and 57 extend in the Y-axis direction are implanted, and on both sides of the supporting plates 56 and 57, a plurality of plate-shaped detecting movable interdigitated electrodes 58 and 59 are provided, respectively.

On both sides in the X-axis direction of the weight portion 53, the fixed portions 60 and 61 are arranged to oppose the movable interdigitated electrodes 54 and 55, respectively. On the fixed portions 60 and 61, a plurality of plate-shaped fixed interdigitated electrodes 62 and 63 are provided, respectively, so as to interdigitate (mesh) with the movable interdigitated electrodes 54 and 55, respectively, via a micro-gap. That is, the electrode faces of the movable interdigitated electrodes 54 and 55 and the electrode faces of the fixed interdigitated electrodes 62 and 63 face each other via micro-gaps g. In addition, on both sides in the Y-axis direction of the weight portion 53, detecting fixed portions 64 and 65 are provided, and on the detecting fixed portions 64 and 65, two fixed electrode supporting plates 66 and two fixed electrode supporting plates 67 extend toward the weight portion 53 in parallel, with the movable electrode supporting plates 56 and 57 therebetween, respectively. On the fixed electrode supporting plates 66 and 67, similarly to the fixed electrodes 62 and 63, plate-shaped detecting fixed interdigitated electrodes 68 and 69 are formed so as to interdigitate with and oppose the detecting movable interdigitated electrodes 58 and 59 via micro-gaps g. It should be noted that the fixed portions 60 and 61 and detecting fixed portions 64 and 65 are electrically separated from the supporter 51 by a slit provided therearound.

Figure 3:
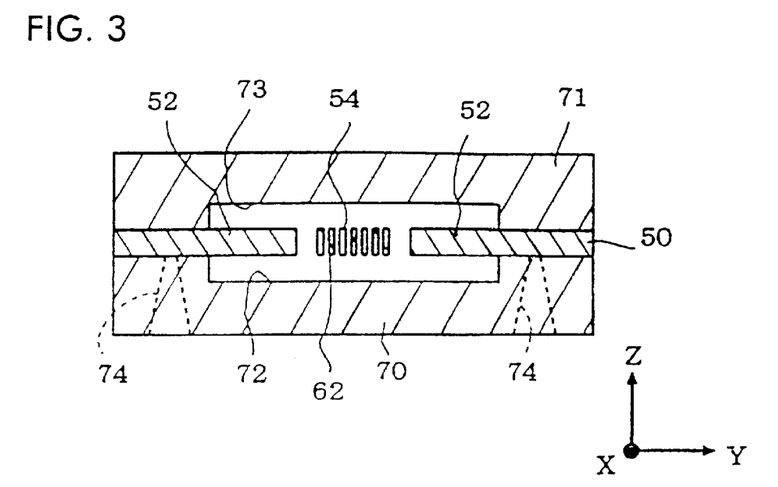
FIG. 3 is a sectional view showing a configuration of the external force detecting sensor along line III—III in FIG. 2.

The functional element 50 of the above-described configuration is supported by a supporting substrate 70 and is protected by a cap substrate 71, as shown in FIG. 3. The supporting substrate 70 and cap substrate 71 are made of, for example, a Pyrex glass material, and have recesses 72 and 73, both having a height (depth) D, formed thereon, and by sandwiching the functional element 50 by opposing the recess 72 and the recess 73, a cavity having enough space to ensure the displacement of the movable portion is formed at a portion including the beams 52 and the movable portion of the functional element 50. The functional element 50 is made by processing a silicon substrate of thickness h, and the movable interdigitated electrodes 54 and 55 and fixed interdigitated electrodes 62 and 63 are rectangular in cross-section and have a height h and width W, and form large opposing surfaces. In addition, the fixed portions 60 and 61 and detecting fixed portions 64 and 65 of the functional element 50 are electrically connected to the outside, for example, via via-holes 74 provided on the supporting substrate 70.

Now, an operation of the above-described external force detecting sensor is described. Ordinarily, since the supporter 51 is grounded, when an A.C. voltage is applied across the fixed portions 60 and 61 and the supporter 51, an electrostatic force is exerted between the movable interdigitated electrodes 54 and 55 and the fixed interdigitated electrodes 62 and 63, and the weight portion 53 vibrates in the X-axis direction with a fixed amplitude. At this time, if the external detecting sensor receives a rotating force about the Z-axis passing through the center of the weight portion 53, a Coriolis force is exerted in the Y-axis direction, and the weight portion 53 is displaced in the Y-axis direction. Thus, the electrostatic capacitances between the detecting movable interdigitated electrodes 58 and 59 and the detecting fixed interdigitated electrodes 68 and 69 vary. Accordingly, an angular velocity signal due to the varying electrostatic capacitances may be obtained from the detecting fixed interdigitated electrodes 68 and 69.

If an impact force is applied to the weight portion 53 while the movable portion 50a is operating in this way, or while the movable portion 50a is at standstill, the weight portion 53 moves suddenly. For example, in FIG. 2, for a vector component of the impact force in the X-Y plane, the movable interdigitated electrodes 54 and 55 and detecting movable interdigitated electrodes 58 and 59 of the weight portion 53 collide with the neighboring fixed interdigitated electrodes 62 and 63 and the detecting fixed interdigitated electrodes 68 and 69 or the fixed portions 60 and 61 and the detecting fixed portions 64 and 65. For a vector component in the Z-axis direction, the weight portion 53 collides with the bottom surface 72 of the supporting substrate 70 or the top surface 73 of the cap substrate 71, and then returns to the original standstill position. In addition, when the weight portion 53 receives the vector component in the Y-Z plane, even if the weight portion 53 rises or falls in an oblique direction to collide with the top surface 73 or the bottom surface 72, in other words, even if the movable interdigitated electrodes 54 and 55 and detecting movable interdigitated electrodes 58 and 59 fall on the neighboring fixed interdigitated electrodes 62 and 63 and detecting fixed interdigitated electrodes 68 and 69, the movable interdigitated electrodes 54 and 55 and detecting movable interdigitated electrodes 58 and 59 do not jump over the fixed interdigitated electrodes 62 and 63 and detecting fixed interdigitated electrodes 68 and 69; rather, they return to the original standstill position due to the resiliency of the beams 52.

Figure 4:
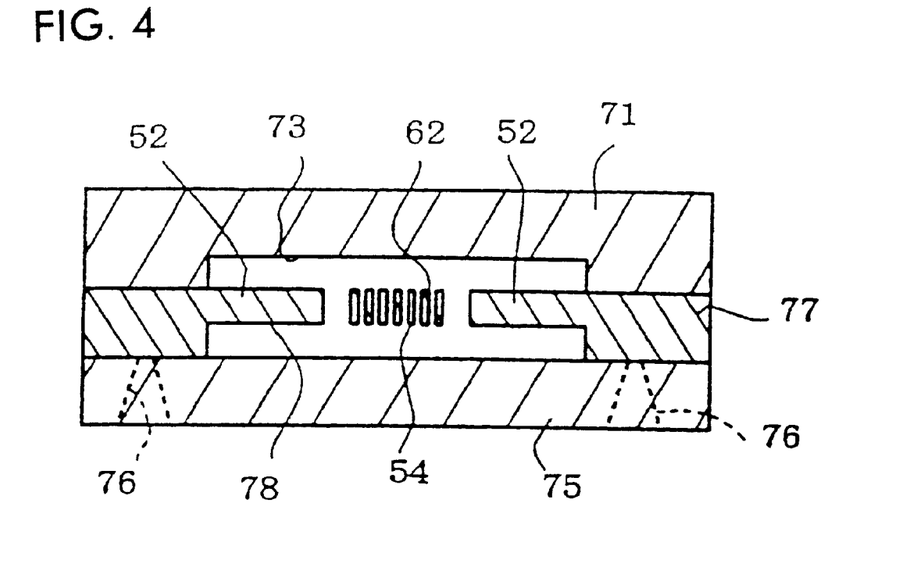
FIG. 4 is a sectional view showing another configuration of the external force detecting sensor along line III—III in FIG. 2.

FIG. 4 shows another embodiment of the external force detecting sensor. A planar substrate is used for a supporting substrate 75, and similarly to FIG. 3, via-holes 76 are provided thereon. A functional element 77 is formed by using a thicker silicon substrate than the one in FIG. 3, and a recess 78 having a depth D is formed by dry etching such as RIE (reactive ion etching) from the back surface where the supporting substrate 75 is provided. Due to this recess 78, the beams 52 and the movable portion 50a of the functional element 77 have a thickness h, similarly to FIG. 3. The planar shape of the functional element 77 has the same configuration as FIG. 2, and that of the cap substrate 71 is also the same. Here, a cavity is formed by a recess 78 of the functional element 77 and a recess 73 of the cap substrate 71.

In FIG. 3, if the thickness h of the functional element 50 is set at 40 μm, the widths W of the movable interdigitated electrodes 54 and 55 and the fixed interdigitated electrodes 62 and 63 are set at 3 μm, the gaps g between the movable interdigitated electrodes 54 and 55 and the fixed interdigitated electrodes 62 and 63, respectively, are set at 2 μm, the depths D of the recesses 72 and 73 formed on the supporting substrate 70 and cap substrate 71 of 400 mm thickness are set to be 160 μm. Namely, the threshold limit value of the height from the fixed interdigitated electrodes 62 and 63 to the top surface and the bottom surface of the cavity is 160 μm.

According to the external force detecting sensor according to the first aspect of the invention, since a threshold limit value is set for the height in spite of the fact that the top and bottom surfaces of the cavity are formed as high as possible, the movable portion can operate without being affected by air damping due to viscosity of air (or gas) in the cavity, and in addition, even if the movable portion skips due to an impact force caused by dropping or the like of the external force detecting sensor or a hitting force or the like applied to an apparatus on which the external force detecting sensor is mounted, the movable interdigitated electrode never ride on the fixed interdigitated electrode to be caught there resulting in operation failure, and the movable portion can securely return to the original standstill position due to the resiliency of the beams.

In addition, since the top and bottom surfaces of the cavity have enough height, when the external force detecting sensor is manufactured, the movable portion can be prevented from being bonded to the cap substrate due the electrostatic attraction resulting in operation failure, mainly in the anodic bonding process of the functional element composed of silicon and the cap substrate composed of glass.

According to the external force detecting sensor according to the second aspect of the present invention, since the threshold limit height of the top and bottom surfaces of the cavity can realized by a height (depth) of recesses provided on the supporting substrate and the cap substrate, the supporting substrate and the cap substrate are formed in the same shape by use of the same processing method, thereby simplifying the manufacture of the external force detecting sensor.

According to the external force detecting sensor according to the third aspect of the present invention, since a part of the cavity is obtained by processing the functional element, a cavity resistant to the impact force applied to the movable portion can be obtained even if a recess is not formed on the supporting substrate or the cap substrate.

According to the external force detecting sensor according to the fourth aspect of the present invention, since the height from the fixed interdigitated electrode to the top and bottom surfaces of the cavity is determined by taking the movable interdigitated electrode and the fixed interdigitated electrode into consideration as elements, even if a strong impact force is applied to the external force detecting sensor, the top and bottom surfaces of the cavity function as stoppers, thus the operation of the external force detecting sensor can be maintained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An external force detecting sensor, comprising:
   a supporting element defining a cavity having top and bottom surfaces, and
   a functional element disposed in the cavity, the functional element including a supporter, a movable portion having a movable electrode, and a fixed portion having a fixed interdigitated electrode opposing said movable electrode via a gap;
   wherein a height D from said fixed interdigitated electrode to the top and bottom surfaces of said cavity satisfies the following expression:

$$D \leq \frac{h}{g}(g + W1 + W2)$$

where a width of said gap is g, a width of said movable electrode is W1, a width of said fixed electrode is W2, and a height of said movable electrode and said fixed electrode is h.

2. An external force detecting sensor, comprising:
   a functional element including a supporter, a movable portion having a movable interdigitated electrode, rectangular in cross-section, coupled with said supporter by a beam, and a fixed portion having a fixed interdigitated electrode on one side thereof via a gap;
   a supporting substrate for supporting said functional element from the surface thereof at one side;
   a cap substrate mounted on said functional element from the surface thereof at the other side;
   wherein a cavity which enables displacement of said movable portion is formed at a portion including said beam and said movable portion, the cavity having top and bottom surfaces, and
   a height D from said fixed interdigitated electrode to the top and bottom surfaces of said cavity satisfies the following expression:

$$D \leq \frac{h}{g}(g + W1 + W2)$$

where a width of said gap is g, a width of said movable interdigitated electrode is W1, a width of said fixed interdigitated electrode is W2, and a height of said movable interdigitated electrode and said fixed interdigitated electrode is h.

3. An external force detecting sensor, comprising:
   a functional element including a supporter, a movable portion having a movable interdigitated electrode, rectangular in cross-section, coupled to said supporter by a beam, and a fixed portion having a fixed interdigitated electrode, rectangular in cross-section, opposing said movable interdigitated electrode on one side thereof via a gap;
   a supporting substrate for supporting said functional element, said supporting substrate being provided with a first recess which enables displacement of said movable portion; and
   a cap substrate for protecting said functional element, said cap substrate being provided with a second recess which enables displacement of said movable portion, each of said first and second recesses having a height D;
   wherein the height D of said first recess and said second recess satisfies the following expression:

$$D \leq \frac{h}{g}(g + W1 + W2)$$

where a width of said gap is g, a width of said movable interdigitated electrode is W1, a width of said fixed interdigitated electrode is W2, and a height of said movable interdigitated electrode and said fixed interdigitated electrode is h.

4. An external force detecting sensor, comprising:
   a functional element including a supporter, a movable portion having a movable interdigitated electrode, rectangular in cross-section, coupled to said supporter by a beam, and a fixed portion having a fixed interdigitated electrode, rectangular in cross-section, opposing said movable interdigitated electrode on one side thereof via a gap;

a supporting substrate for supporting said functional element; and a cap substrate mounted on said functional element from a side opposite to said supporting substrate;

wherein a cavity is formed at a portion including said beam and said movable portion, said cavity being defined between any two of said functional element, said supporting substrate, and said cap substrate, the cavity having top and bottom surfaces, and a height D from said fixed interdigitated electrode to the top and bottom surfaces of said cavity satisfies the following expression:

$$D \leq \frac{h}{g}(g + W1 + W2)$$

where a width of said gap is g, a width of said movable interdigitated electrode is W1, a width of said fixed interdigitated electrode is W2, and a height of said movable interdigitated electrode and said fixed interdigitated electrode is h.

5. An external force detecting sensor, comprising:

a functional element including a fixed portion, a supporter, and a movable portion coupled to said supporter by a beam;

a supporting substrate for supporting said functional element; and a cap substrate for protecting said functional element;

wherein said supporting substrate and said cap substrate are arranged so as to sandwich said functional element from opposite surfaces of said functional element while forming a cavity, which enables displacement of said movable portion, at a portion including said beam and said movable portion, the cavity having top and bottom surfaces;

said movable portion being provided with a movable interdigitated electrode, rectangular in cross-section, and said fixed portion being provided with a fixed interdigitated electrode, rectangular in cross-section, which is interdigitated with said movable interdigitated electrode on one side thereof via a common gap, a height from said fixed interdigitated electrode to the top and bottom surfaces of said cavity being set to be the same as or lower than a height of a surface of said movable interdigitated electrode at a far side from said fixed interdigitated electrode when said movable interdigitated electrode is moved along a straight line passing through corners diagonally positioned on opposing sides of said movable interdigitated electrode and said fixed interdigitated electrode which are adjacent across said common gap, and when surfaces of said movable interdigitated electrode and said fixed interdigitated electrode on sides which are not opposed are positioned in the same plane.

6. An external force detecting sensor according to any of claims 2–5, further including an additional fixed interdigitated electrode, rectangular in cross section, opposing said movable interdigitated electrode on an opposite side thereto, wherein the width of the additional fixed interdigitated electrode is W3 and the height D also satisfies the relationship:

$$D \leq \frac{h}{g}(g + W1 + W3).$$

* * * * *